United States Patent [19]

Ocken, Jr. et al.

[11] 3,929,022

[45] Dec. 30, 1975

[54] RECESSED METER IN A HOUSING AND METHOD OF ADJUSTING THE SAME

[75] Inventors: Alfred G. Ocken, Jr., Franklin Park; William G. Skoda, Oak Park, both of Ill.

[73] Assignee: Motorola, Inc., Chicago, Ill.

[22] Filed: Dec. 31, 1974

[21] Appl. No.: 537,745

[52] U.S. Cl.......... 73/431; 116/129 A; 324/154 PB; 324/156
[51] Int. Cl.² ............................................ G01D 11/24
[58] Field of Search..... 116/124 G, 129 A, DIG. 36, 116/DIG. 37, 129 R; 73/431, 432 A, 498; 324/156, 154 PB, 154 R; 177/238, 256, 257, 258; 317/104, 105, 107, 109, 111; 74/569; D10/127

[56] References Cited
UNITED STATES PATENTS

| 2,440,392 | 4/1948 | Butler | 116/129 |
| 2,963,651 | 12/1960 | Richards et al. | 116/129 R |
| 3,032,004 | 5/1962 | Keeling, Sr. | 116/129 R |

OTHER PUBLICATIONS

Cenco Physics Apparatus Catalog, Central Scientific Company, 1965, p. 224.

*Primary Examiner*—Richard C. Queisser
*Assistant Examiner*—Marcus S. Rasco
*Attorney, Agent, or Firm*—James W. Gillman; Donald J. Lisa

[57] ABSTRACT

A toothed cam is affixed to the adjusting screw of a conventional ballistic meter. The meter is mounted in the surface of a housing which is oblique to the top surface of the base of the housing. An access hole is provided in the base top surface for external access to the teeth of the cam.

18 Claims, 6 Drawing Figures

RECESSED METER IN A HOUSING AND METHOD OF ADJUSTING THE SAME

BACKGROUND OF THE INVENTION

This invention relates generally to meters mounted in housings and in particular to the method and apparatus of statically adjusting meters so mounted.

Meters are commonly provided with an indicating needle which is in alignment to a scale face. As the needle is mechanically coupled to the meter movement, needle position is a function of mechanical tolerances. For this reason, such meters are provided with an adjustment shaft, which, when rotated, varies the static position of the needle relative to the scale. Frequently it is desired that the needle read opposite the zero mark on the scale face in the static position. Thus the adjustment shaft would be so rotated to provide a zero set reading of the needle.

One approach to a shaft adjustment system for meters is given in U.S. Pat. No. 2,529,557 to Keroes. There an internal segmental gear is coupled to the needle such that pivotal movement of the gear causes angular movement of the needle. A stud having a head mounted externally of the housing at one end and a pinion at the other is located such that the pinion meshes with the segmental gear. The user may turn a screwdriver in the head thus rotating pinion and segmental gear to adjust the static angular position of the needle with respect to the dial face.

Another such screwdriver type adjusting devices is suggested in U.S. Pat. No. 3,032,004 to Keeling. Keeling describes means for adjusting a temperature indicating dial with respect to a supporting shaft. There a slot is provided in the dial face to allow access to an internal pinion gear beneath. Pushing on the pinion gear and rotating the pinion gear effects dial adjustment.

Some meters decouple the set adjustment from the meter movement once the meter has been adjusted. Commonly, the adjustment shaft is provided with an engaging slot at its anterior face and an eccentrically located pin extending from its posterior face. The shaft is positioned such that when rotated via a tool in the engaging slot, the pin engages one of the arms in an inverted wye fork. Since the fork is fixedly coupled to the meter movement, a deflection in the fork relocates the needle. Once adjustment is accomplished, the shaft is counter rotated, relocating the pin in the gap between the arms. This decouples the shaft from the fork, and, in so doing, minimizes adjustment error due to external vibration.

A serious problem with such decoupling systems results if the shaft is located such that the pin makes maximum penetration into the arms of the fork, i.e. a shaft rotation of 180° from the desired position. Since the arms are in an inverted wye configuration, excessive pin penetration greatly reduces the gap between pin and arms, resulting in diminished decoupling capability. It is crucial during manufacture, therefore, that the shaft be located in the meter movement with the proper phase relationship, i.e., positional relation between the pin and the fork arms. However, mislocated shafts are not uncommon. Once the shaft is inserted only its engaging face is visible and, as the engaging face is symmetrical, the phasing of the shaft cannot be determined by visual inspection. Thus much time is spent locating and correcting improperly phased adjustment shafts.

Meter housings have conventionally been rectangular boxes. However, a deficiency in such housings is that the meter, located in a horizontal plane, is not easy to read. Therefore, modern meter housings include a base portion supporting the instrument, and a portion slanted to the horizontal to which the meter is attached. In such housings, the instrument may be placed on a flat surface yet the meter is slanted at an angle convenient for visual inspection.

A problem arises when a conventional meter is placed in a modern housing. The meter adjusting shaft is commonly located directly beneath the pivotal point of the needle, and is adjustable via an engaging tool inserted at an angle to the face of the meter. If the access hole to the meter adjust shaft is provided in the slanted face of the housing, the housing face must consist of a considerable added dimension just to accommodate the hole. On the other hand, if the access hole is located in the base portion of the housing, two problems arise. Firstly, the shaft would be recessed beneath the hole in a cumbersome place. Secondly, as the head of the adjusting shaft would be in a plane acute to the surface plane of the base portion, the access hole would either have to be enlarged or critically angled in order that an inserted screwdriver blade might engage the slot in the head.

SUMMARY OF THE INVENTION

Accordingly, it is an object of the present invention to provide a method and apparatus for conveniently and accurately adjusting a meter located in a slanted housing.

It is a further object of the present invention to provide a method and apparatus as above described which is easily adaptable to conventional meters and which is inexpensive in manufacture.

It is a further object of the present invention to provide a method and apparatus of the above described type which allows meter adjustment with other than a bladed tool.

Yet another object of the present invention is to provide a method and apparatus as above described which provides a direct visual readout of the angular position of the adjusting shaft.

Briefly, according to the invention, a toothed cam is affixed to the adjusting shaft of a conventional meter such that a pivotal rotation of the cam affects the static position of the meter's needle. The meter is mounted in the slanted plane of a housing such that the meter face is aligned with the plane. Oblique to the slanted plane is the top surface of the base of the housing. This surface is provided with a window located for external access to the teeth of the toothed cam. The teeth of the cam may be engaged by any suitable object through the window whereby the cam is rotated by the object. In this manner the meter adjustment is effected. Further, the asymmetric cam provides a direct visual readout of adjusting shaft angle of rotation.

DETAILED DESCRIPTION OF THE PREFERRED EMBODIMENT OF THE INVENTION

Figure 1:
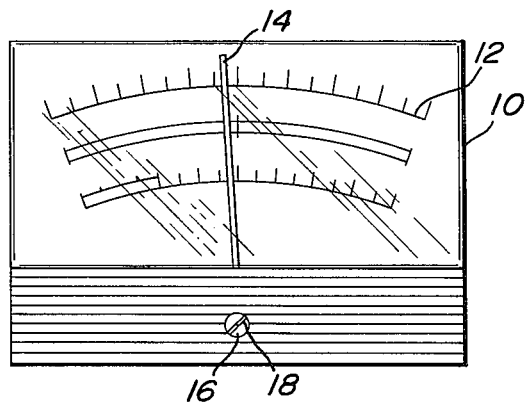
FIG. 1 illustrates a conventional meter having needle, face scale, and adjusting shaft.

In the drawings similar numbers are used throughout for clarification.

In FIG. 1, illustrated generally is a meter 10, having a scale 12 and a needle 14 which is cooperable and in alignment with the scale. Mechanically coupled to the needle 14 is an adjustment shaft 16 provided with an engaging slot 18. The adjustment shaft 16 is mechanically coupled during adjustment to the needle 14, such that when the engaging slot 18 is engaged by a tool suitable for rotating the shaft 16, the needle 14 is relocated with respect to the scale 12. Commonly, the scale will contain a zero or set line reading to which the needle will be adjusted via the adjustment shaft in the static condition. The mechanical coupling of the adjustment shaft 16 to the meter movement and needle 14 is accomplished in a manner well known in the art.

Figure 2:
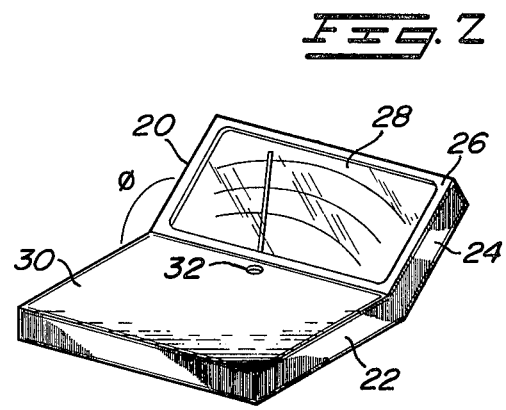
FIG. 2 illustrates a modern meter housing including a base portion and a slanted portion for meter mounting.

FIG. 2 illustrates a modern meter housing 20 having a base portion 22 and a meter mounting portion 24. The meter mounting portion 24 has a face surface 26 which is provided with a meter viewing window 28. The face surface is in a plane which is at an oblique angle $\phi$ to a plane containing the top surface 30 of the base portion. The base portion is provided with an access window 32, the function of which is described below.

Figure 3:
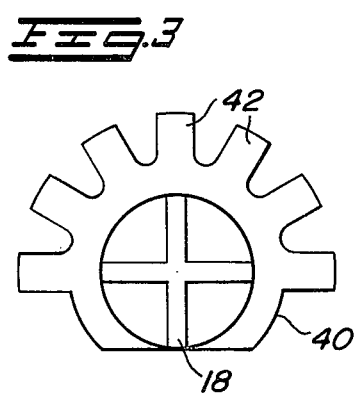
FIG. 3 is a plan view illustrating the toothed cam.

FIG. 3 illustrates a toothed cam 40 which is substantially semicircular in shape and which has a plurality of teeth 42 radially extending from the circular surface of the cam.

Figure 4:
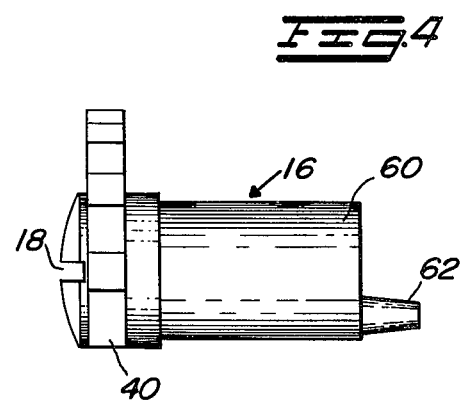
FIG. 4 is a side view illustrating the toothed cam affixed to the adjusting pin of the meter.

FIG. 4 illustrates the cam of FIG. 3 affixed to the conventional meter adjusting shaft 16. The adjusting shaft 16 includes a main body 60 which is cylindrically shaped and which is further provided with an engaging slot 18 at its posterior and an eccentrically located pin 62 at its anterior. When located within a meter assembly, the eccentrically located pin 62 couples to the meter movement which in turn locates the needle 14. A bladed tool such as a screwdriver may be used to engage the engaging slot 18 with the result that turning the screwdriver rotates the adjusting screw body 60 which in turn relocates the eccentrically located pin 62, in turn relocating the needle.

Shown affixed to the posterior of the adjusting shaft is the toothed cam 40. The teeth 42 are located as to be on a radius extending from the longitudinal axis of the adjusting shaft 16. While the toothed cam 40 may be affixed to the adjusting shaft 16 by various known means, it is preferrable to mold the adjusting shaft and the cam as a single unit.

Figure 5:
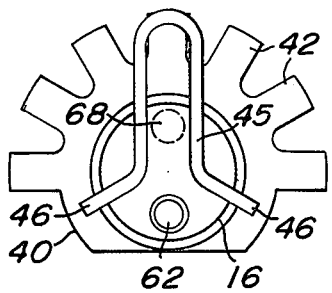
FIG. 5 is a posterior view of the adjusting pin shown in alignment with the fork of the meter mechanism.

FIG. 5 illustrates the cam and adjusting shaft in alignment with a fork 45 of the meter mechanism. The fork 45, of an inverted wye configuration, couples to the needle such that when either wye arm 46 is engaged, the fork, and thereby needle, relocate. The pin 62 of the adjusting shaft is shown centrally located between the arms 46. When meter adjustment is required, the shaft 16 is rotated causing the eccentrically located pin 62 to engage one of the arms 46. Once the needle is set adjusted, the shaft is counter rotated to centrally locate the pin thereby decoupling the adjusting shaft from the fork. This minimizes adjustment error due to external vibration.

With a conventional adjusting shaft it is common to find the shaft rotated 180°, thus positioning the pin 62 as shown at 68. As can be seen, since the wye arms 46 converge, the misphased shaft does not allow proper clearance between the pin 62 and the wye arms 46. This degrades the decoupling feature above described and results in a meter whose set adjustment is particularly susceptible to error due to external vibration.

Once a conventional shaft is located in the meter mechanism it is difficult to tell if it is properly phased. A visual inspection reveals nothing since the only visible portion of the shaft is the engaging phase, and this face is symmetric. If the adjusting shaft is provided with the toothed cam, according to the invention, which has a predetermined phase alignment between the cam and the pin, the cam provides a direct visual readout of the angular position of the pin, thereby assuring properly phased pin and fork meter mechanisms.

Figure 6:
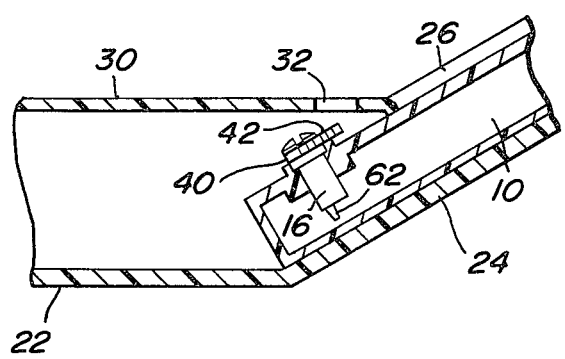
FIG. 6 is a cross-sectional side view of the meter housing of FIG. 2 showing the meter with the provided cam mounted in the slanted portion of the housing.

With the cam affixed to the adjusting screw and the screw relocated within the meter, the meter is then mounted in the housing as is illustrated, in cross-sectional view, in FIG. 6. The meter 10 is mounted in the meter mounting portion 24 such that the scale and needle are readily visible through the meter viewing window. A user viewing the meter would thus see the meter readout in a plane parallel to the plane which contains the face surface 26 of the meter mounting portion 24.

At an oblique angle $\phi$ to the face surface 26 is the top surface 30 of the base portion 22 of the housing. A circular access window 32 is provided in the top surface 30 such that external access may be made to the teeth 42 of the cam 40.

To adjust the static position of the needle, any object which is suitable for engaging the teeth 40 may be inserted through the access window 32. When the object forcibly engages the teeth 42, the object is moved in a plane at an angle to the axis of rotation of the adjusting shaft thereby rotating the adjusting shaft 16 about its axis, thus relocating the eccentric pin 62 to thereby readjust the meter reading. The device, according to the invention, allows the insertion of any pointed object through the access window which might then engage the teeth 42.

If the adjustment shaft 16 were not provided with the cam 40 it is seen that setting the meter would become quite a problem. First, the adjusting shaft is considerably recessed from the top surface of the housing. This would make engagement of a screwdriver through the access window to the engaging slot quite cumbersome, if not impossible. Furthermore, the axis of the adjusting shaft is not perpendicular to the top surface of the housing. Since a screwdriver would have to be on axis with the axis of the adjusting shaft, for adjusting the shaft, it is apparent that the access window would also have to be provided on the axis of the adjusting shaft. Such a hole would have to be relatively large to admit the screwdriver head and would permit excessive dust to enter the housing. In contrast, the access window of the present invention can be quite small.

While a preferred embodiment has been described according to the invention countless variations thereof are possible all of which fall within the true spirit and scope of the invention. For example, instruments other than meters which require set adjustments may employ the invention. Such set adjustments need not require a rotational movement. An embodiment according to the invention might employ a toothed rack which is used to laterally translate the adjusting mechanism of the instrument.

We claim:
1. The method of adjusting an instrument having an adjustable set member, and mounted in a housing having a meter face surface and a base surface comprising the steps of:
   a. affixing a toothed member to the adjustable set member of the instrument;
   b. mounting the instrument in alignment with the meter face surface in a first plane of the housing having the base surface in a second plane oblique to the first plane;
   c. positioning the toothed member below the base surface;
   d. providing a window in the base surface for external access to the toothed member;
   e. inserting an object suitable for engaging the toothed member through the window, and;
   f. moving the toothed member with the object.
2. The method of claim 1 wherein the instrument is a meter having a scale further comprising the step of aligning the needle indicator to the scale.
3. The method of claim 1 wherein the affixing step includes forming the toothed member as a substantially semicircular cam having the teeth formed on the circular surface thereof.
4. The method of claim 3 wherein the affixing step further includes affixing the cam to the set member in a predetermined alignment.
5. The method of claim 3 wherein the forming step includes forming the cam and the adjustable set member integrally.
6. The method of claim 1 wherein the inserting step is performed with an object which is sufficiently pointed to engage the teeth on the toothed member.
7. The method of claim 6 wherein the inserting step includes inserting the object through the window generally perpendicularly to the base surface.
8. The method of claim 1 wherein the moving step includes rotating the toothed member with the object about an axis perpendicular to the meter face surface.
9. The method of claim 8 wherein the rotating step includes moving the object between two teeth of the toothed member in a plane at an angle to the plane of the axis of rotation of the adjustable set member.
10. An instrument and housing including
    an instrument having a readout viewable in a plane, the readout having a mechanical set adjustment accessible through the plane of readout view,
    a housing having a first surface containing the instrument and a second surface, oblique thereto, provided with an access window, and
    a toothed member mechanically coupled to the set adjustment and located under the window for external access to the teeth thereof.
11. The instrument and housing of claim 10 wherein the readout includes a meter having a scale and a needle cooperable thereto.
12. The instrument and housing of claim 10 wherein the set adjustment includes a shaft the rotation of which sets the readout.
13. The instrument and housing of claim 12 wherein the member is a cam, substantially semicircular in shape, having the teeth formed on the circular surface thereof.
14. The instrument and housing of claim 13 wherein the cam is affixed to the shaft.
15. The instrument and housing of claim 14 wherein the cam is affixed to the shaft in a predetermined phase alignment.
16. The instrument and housing of claim 14 wherein the cam and shaft are integral.
17. The instrument and housing of claim 10 wherein the second surface comprises the top surface for the base of the housing.
18. The instrument and housing of claim 10 wherein the mechanical set adjustment is rotatable about an axis perpendicular to the plane of the readout.

* * * * *